United States Patent
Fogarty

(10) Patent No.: US 8,380,595 B1
(45) Date of Patent: Feb. 19, 2013

(54) PREDICTION MARKET ROLL UP

(75) Inventor: Matthew John Fogarty, Palo Alto, CA (US)

(73) Assignee: Spigit, Inc., Pleasanton, CA (US)

( * ) Notice: Subject to any disclaimer, the term of this patent is extended or adjusted under 35 U.S.C. 154(b) by 997 days.

(21) Appl. No.: 12/172,140

(22) Filed: Jul. 11, 2008

Related U.S. Application Data

(60) Provisional application No. 60/955,826, filed on Aug. 14, 2007, provisional application No. 60/950,700, filed on Jul. 19, 2007.

(51) Int. Cl.
*G06Q 40/00* (2006.01)

(52) U.S. Cl. .......... 705/35; 705/37; 705/39; 705/44; 705/36 R

(58) Field of Classification Search ........... 705/15–45, 705/7; 345/440–442
See application file for complete search history.

(56) References Cited

U.S. PATENT DOCUMENTS

| | | | |
|---|---|---|---|
| 7,155,510 B1 | 12/2006 | Kaplan | |
| 2002/0073009 A1 | 6/2002 | Hogg et al. | |
| 2003/0074166 A1 | 4/2003 | Jackson et al. | |
| 2003/0078829 A1 | 4/2003 | Chen et al. | |
| 2004/0002891 A1 | 1/2004 | Chen et al. | |
| 2005/0256800 A1 | 11/2005 | Hogg et al. | |
| 2006/0122927 A1 | 6/2006 | Huberman et al. | |
| 2006/0205483 A1 | 9/2006 | Meyer et al. | |
| 2006/0206365 A1* | 9/2006 | Boardman et al. ............ | 705/7 |
| 2007/0078756 A1 | 4/2007 | Hogg et al. | |
| 2007/0136105 A1 | 6/2007 | Huberman et al. | |
| 2007/0136429 A1 | 6/2007 | Fine et al. | |
| 2009/0076939 A1* | 3/2009 | Berg et al. ................... | 705/37 |

OTHER PUBLICATIONS

"Economic Derivatives Markets—New Opportunities for Individual Investors: A Research Agenda", Financial Services Review, Robert Dubil, v16n2, pp. 89-104, Summer 2007.*
US PTO Office Action mailed Mar. 12, 2012, U.S. Appl. No. 12/478,738.
Applicants' Jul. 12, 2012 response to US PTO Office Action mailed Mar. 12, 2012, U.S. Appl. No. 12/478,738.

* cited by examiner

*Primary Examiner* — Hai Tran

(57) ABSTRACT

Various problems currently exist in the operation of using prediction markets for corporate forecasting. One of these problems we address is the problem related to the "consistency and consolidation of metrics". We hierarchically structure and link sets of markets traded using an automated market maker and dynamically balance markets.

18 Claims, 4 Drawing Sheets

| Products | Reg 1 | Reg 2 | Reg 3 | WW |
|---|---|---|---|---|
| | | Regions | | |
| Sports product A | 10 | 5 | 3 | 18 |
| Sports product B | 15 | 7 | 2 | 24 |
| Sports product C | 5 | 10 | 2 | 17 |
| Sports products | 30 | 22 | 7 | 59 |
| Driving product | 5 | 8 | 4 | 17 |
| Household product | 4 | 5 | 2 | 11 |
| Other products | 12 | 9 | 6 | 27 |
| Total Revenue | 51 | 44 | 19 | 114 |

Reg 1 total (51) can be drilled down to show product data

WW (114) can be drilled down to show regional data

|  | Regions | | | |
| --- | --- | --- | --- | --- |
| Products | Reg 1 | Reg 2 | Reg 3 | WW |
| Sports product A | 10 | 5 | 3 | 18 |
| Sports product B | 15 | 7 | 2 | 24 |
| Sports product C | 5 | 10 | 2 | 17 |
| Sports products | 30 | 22 | 7 | 59 |
| Driving product | 5 | 8 | 4 | 17 |
| Household product | 4 | 5 | 2 | 11 |
| Other products | 12 | 9 | 6 | 27 |
| Total Revenue | 51 | 44 | 19 | 114 |

Reg 1 total (51) can be drilled down to show product data

WW (114) can be drilled down to show regional data

*Fig. 1*

| | | |
| --- | --- | --- |
| WW sales of Sports products | 59 | In discrete |
| WW sales of Driving products | 17 | markets, sum |
| WW sales of Household products | 11 | of the parts |
| WW sales of other products | 27 | may not equal |
| WW revenue of all products | 120 | total |

*Fig. 2*

|  | Regions | | | |
|---|---|---|---|---|
| Products | Reg 1 | Reg 2 | Reg 3 | WW |
| Sports product A | 10 | 5 | 3 | 18 |
| Sports product B | 15 | 7 | 2 | 24 |
| Sports product C | 5 | 10 | 2 | 17 |
| Sports products | 30 | 22 | 7 | 59 |
| Driving product | 5 | 8 | 4 | 17 |
| Household product | 4 | 5 | 2 | 11 |
| Other products | 12 | 9 | 6 | 27 |
| Total Revenue | 51 | 44 | 19 | 114 |

*Fig. 3*

1 added to bottom level metric due to trading action

|  | Regions | | | |
|---|---|---|---|---|
| Products | Reg 1 | Reg 2 | Reg 3 | WW |
| Sports product A | 11 | 5 | 3 | 19 |
| Sports product B | 15 | 7 | 2 | 24 |
| Sports product C | 5 | 10 | 2 | 17 |
| Sports products | 31 | 22 | 7 | 60 |
| Driving product | 5 | 8 | 4 | 17 |
| Household product | 4 | 5 | 2 | 11 |
| Other products | 12 | 9 | 6 | 27 |
| Total Revenue | 52 | 44 | 19 | 115 |

Summary metrics are adjusted by +1 as they are sums of the bottom level metrics

*Fig. 4*

|  | Before | | | After | | |
|---|---|---|---|---|---|---|
|  | Reg 1 | % of total |  | Reg 1 | % of total |  |
| Sports product A | 11 | 35% |  | 12.1 | 35% | 2) Bottom level |
| Sports product B | 15 | 48% |  | 16.5 | 48% | metrics are |
| Sports product C | 5 | 16% |  | 5.5 | 16% | adjusted |
| Sports products | 31 | | | 34 | | proportionally |

1) Summary metric is traded from 31 to 34

*Fig. 5*

| | Regions | | | |
|---|---|---|---|---|
| Products | Reg 1 | Reg 2 | Reg 3 | WW |
| Sports product A | 12.1 | 5 | 3 | 20.1 |
| Sports product B | 16.5 | 7 | 2 | 25.5 |
| Sports product C | 5.5 | 10 | 2 | 17.5 |
| Sports products | 34 | 22 | 7 | 63 |
| | | | | |
| Driving product | 5 | 8 | 4 | 17 |
| Household product | 4 | 5 | 2 | 11 |
| Other products | 12 | 9 | 6 | 27 |
| Total Revenue | 55 | 44 | 19 | 118 |

3) Other summary metrics adjust

*Fig. 6*

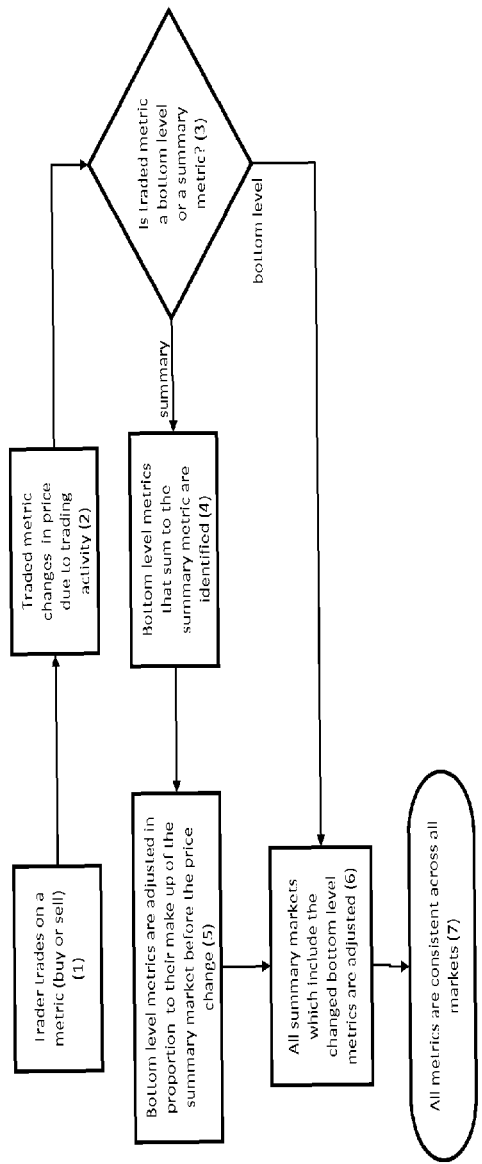

Fig. 7

Notes on Fig. 7

(1) The trader finds a metric that they believe presents opportunities for profitable trading. The trader trades on this metric (buys or sells the stock).
(2) The buying or selling of the metric changes the price of the metric
(3) The metric is tagged as a bottom level metric or as a summary metric
(4) Summary metrics are tagged with the bottom level metrics which they are made up of
(5) Bottom level metrics related to the summary metric which has just been traded are adjusted relative to (e.g. in proportion to their share of) the total summary metric before the trade. As all markets are traded using an automated market maker, the price can be adjusted using the market maker.
(6) The other summary metrics which sum up the bottom level metrics adjusted in step 5 (or step 1) are recalculated and the price adjusted using the automated market maker in that market.

PREDICTION MARKET ROLL UP

CROSS REFERENCE TO RELATED APPLICATIONS

This application claims priority under 35 USC 119(e) to provisional application No. 60/955,826 filed Aug. 14, 2007 (incorporated by reference herein in its entirety) and to provisional application No. 60/950,700 filed Jul. 19, 2007 (incorporated by reference herein in its entirety).

STATEMENT REGARDING FEDERALLY SPONSORED RESEARCH OR DEVELOPMENT

No federal funds have been used for research and development.

BACKGROUND

We address various fundamental problems in the use of prediction markets for corporate forecasting.

Prediction Markets

Prediction markets are speculative markets created for the purpose of making predictions. Assets are created whose final value is tied to a particular event (e.g., will the next US president be a Republican) or metric (e.g., total sales next quarter). The current market prices (in the prediction market) can then be interpreted as predictions of the probability of the event or the expected value of the metric. Other names for prediction markets include information markets, decision markets, idea futures, event derivatives, and virtual markets.

Prediction markets can be traded using a continuous double auction (matching of buy and sell orders) or an automated market maker.

Corporate Forecasting

Many corporations and organizations forecast their future financial and operational results. These forecasts are typically structured using bottom-up assumptions and inputs. For example, when forecasting sales revenue for the next fiscal year, the forecast could be constructed using revenue per product per region per month. A typical multinational organization may forecast sales on 100 products in 50 countries over 12 months, this would equate to approximately 60,000 inputs (100×50×12). Forecasts are then consolidated to more summary levels and retain consistency through simple math (e.g. Worldwide annual sales of product A=sum of sales for product A across all months across all countries).

Depending on the requirements and the analysis, this forecast can be reported at multiple levels—product A, in Region B in Month 4, or total sales for the year in Region B, or total sales of product D over the first half of the year for example. For these types of analysis, the data should be consistent, for example, the sum of all regions equals the world wide total. In this way, summary data can be "drilled down" to show bottom level data. For example, FIG. 1 shows how worldwide summary data can be drilled down to show regional summary data, and regional summary data can be drilled down to show bottom level product data for that region.

SUMMARY

Various problems currently exist in the operation of using prediction markets for corporate forecasting. One of these problems we address is the problem related to the "consistency and consolidation of metrics".

We address this problem by hierarchically structuring and linking sets of markets traded using an automated market maker and dynamically balancing markets using an algorithm.

BRIEF DESCRIPTION OF THE DRAWINGS

FIG. 1 shows how worldwide summary data can be drilled down to show regional summary data, and regional summary data can be drilled down to show bottom level product data for that region.

FIG. 2 shows data of a set of five discrete prediction markets.

FIG. 3 illustrates an example data set, where each data item represents a forecast sales figure in dollars.

FIG. 4 is an example of data on which a trade may be made, and FIG. 5 illustrates a result of the trade.

FIG. 6 illustrates an example in which the bottom level metrics are adjusted, and the summary metrics related to the adjusted bottom level metrics are adjusted to maintain consistency.

FIG. 7 is a flowchart illustrating an example of how the prediction market rollup methodology may be implemented.

DETAILED DESCRIPTION

The Problem

To date, prediction markets used for corporate forecasting have been based on sets of discrete forecasted metrics. For example, a set of prediction markets may have a market forecasting a particular region's revenue in a particular time period, or a market forecasting world wide revenue. However, because each of these markets is traded separately from the other markets, it is unlikely that the set of markets will be consistent. Without this consistency, it is challenging to interpret the data. For example, FIG. 2 below shows a set of 5 discrete markets. To be consistent, the result for the first 4 markets should sum to the result for the last market (Total revenue should equal the sum of the revenue per category). However, because the markets are separate, it is not clear if the total should equal 114 (sum of product markets) or 120.

One solution to this problem could be for the corporation to operate only discrete prediction markets on the metrics at the lowest levels. For the multinational in the example above (100 products in 50 countries over 12 months), this would mean running 60,000 discrete prediction markets on the metrics at the lowest level. For summary metrics, world wide revenue for example, the bottom level forecasts could be summed up.

However, for prediction markets to work well, there should be a sufficient number of traders (wisdom of crowds) and sufficient liquidity in each market. Having a very high number of markets, given a limited number of potential traders, would lead to low liquidity in each market, and poor quality forecasts. In addition, many potential participants (especially higher up in the organization) can judge the accuracy of a forecast better at the summary level (e.g. world wide revenue) and may find it difficult to judge accuracy at the bottom level (e.g. sales on product C in Region E in month 7), and so would be unlikely to trade.

In summary, with current methods, it is difficult to use prediction markets for corporate forecasting while maintaining consistency of data between bottom level and consolidated (summary) forecasted metrics.

The Prediction Market Roll Up Solution

We address some or all of these issues using a "Prediction Market Roll Up" (PMRU).

The essence of PMRU is to build a hierarchy of linked markets representing bottom level and summary forecasted metrics. Any metrics (bottom level and summary) can be traded using a prediction market using an automated market maker and all metrics related to the traded data point are adjusted to maintain data consistency.

Example of Intended Use

To explain an example of the PMRU solution, we show how a company can forecast revenue from various products in 3 regions over a single period. The company is interested in the bottom level forecasts (product sales by region) and various summary forecasts—the total revenue for a category of products (sports products), the worldwide revenue by product, total revenue by region and total revenue worldwide.

The example starts with a data set in FIG. 3. Each figure represents the forecast sales in dollars.

Markets are then set up on all the metrics. In this example there are 32 different metrics, 18 bottom level metrics (for a specific product and region) and 14 summary metrics. Therefore there are 32 different potential markets to trade.

Trading on a Bottom Level Forecast

If a trader believes that the forecast for Sports Product A in Reg 1 (10) was too low, the trader could trade (buy shares) in that market which would increase the value of that particular metric. In our example, this buying activity increases the metric from 10 to 11.

In the PMRU solution, the summary markets (boxed) related to this bottom level market adjust automatically by adding 1 to their price (representing the forecast). In this way the data set remains consistent.

Trading on a Summary Level Forecast

The PMRU solution also allows traders to trade in forecasts in summary metrics. To maintain consistency, PMRU method follows a 3 step process.

1. Summary metric is traded, trading action causes metric to change
2. Bottom level metrics that sum to the traded summary metric are adjusted relative to (e.g. in proportion to) their share of the summary metric pre trading.
3. Other summary metrics related to the adjusted bottom level metrics are adjusted For example, if based on the data in FIG. 4, a trader thought that the total sports products sales in Reg 1 should be higher than 31, this trader could trade that particular metric (buy the shares). This would cause the price (and the forecast metric) to rise. In this example (FIG. 5) this buying action causes the metric to rise from 31 to 34 (increase of 3).

To maintain consistency of the bottom level metrics (sales by product in region 1) related to this summary metric, these bottom level metrics are adjusted relative to (e.g. in proportion to) their share of the summary metric before the trading event. For example, Sports Product A represented 35% of the Sports Products total before the trading. After the trade, Sports Product A will still represent 35% of the Sports Products total so will be adjusted from 11 (35% of 31) to 12.1 (35% of 34).

Once the bottom level metrics are adjusted, the summary metrics related to the adjusted bottom level metrics are adjusted (FIG. 6) to maintain consistency.

In this way, although only one metric was traded, an additional 9 metrics were adjusted (3 bottom level and 6 summary) and the matrix of metrics remains consistent.

Note: while the examples illustrate a set of metrics on two dimensions (Regions and Products) in some examples, there may be more than two dimensions. In addition, the examples illustrate forecasts of sales revenue, in some examples the metric forecasted could include other important metrics such as costs or headcounts or profits etc.

The invention claimed is:

1. A method of managing a prediction market, where the prediction market includes a lower level market and a summary market, where the summary market depends nonexclusively on the lower level market, the method comprising:
  receiving data representing a trade in a first market that is one of the lower level market or the summary market;
  using an automated market maker to
    revise a first metric associated with the first market responsive to the trade to obtain an revised first metric,
    revise a second metric associated with the second market responsive to both the adjusted first metric and mathematical dependence of the summary market on the lower level market, to obtain an revised second metric; and
  generating a display representing the revised second metric.

2. The method of claim 1, where the first market is the lower level market and the second market is the summary market.

3. The method of claim 2, where:
  the trade is a trade in the lower level market;
  using the automated market maker includes using the automated market maker to revise the second metric associated with the summary market by summing the revised first metric with a third metric representing a second lower level market, to obtain the revised second metric as a measure of the summary market; and
  generating the display includes generating the display to represent the summary market as a function of the trade in the lower level market.

4. The method of claim 2, further comprising forecasting an event associated with the summary market responsive to the revised second metric, where the event is forecasted in dependence on the trade in the lower level market.

5. The method of claim 1, where the first market is the summary market and the second market is the lower level market.

6. The method of claim 5, where:
  the trade is in the summary market;
  using the automated market maker includes using the automated market maker to revise the second metric associated with the lower level market by scaling the second metric in dependence upon a proportional dependence of the summary market upon lower level market, to obtain the revised second level market as a measure of the lower level market; and
  generating the display includes generating the display to represent the lower level market as a function of the trade in the summary market.

7. The method of claim 6, further comprising forecasting an event associated with the lower level market responsive to the revised second metric, where the event is forecasted in dependence on the trade in the summary market.

8. The method of claim 7, where the lower level market is a first lower level market, and where using the automated market maker includes using the automated market maker to scale a third metric representing a second lower level market in dependence upon a proportional dependence of the summary market upon the second lower level market, to obtain a revised third metric as a measure of the second lower level market, the method further comprising generating the display to represent each of the revised second metric and the revised third metric.

9. The method of claim 1, where each metric is a currency price.

10. The method of claim 1, further comprising generating a display with separate display values respectively representing the revised first metric and the revised second metric.

11. A method of managing a prediction market, where the prediction market includes a lower level market and a summary market, where the summary market mathematically depends on the lower level market, the method comprising:
   receiving data representing a trade in a first market that is one of the lower level market or the summary market;
   using an automatic market maker to reprice the first market in response to the trade;
   using the automated market maker to reprice a second market that is the other of the lower level market and the summary market, in dependence upon the mathematical relationship between the summary market and the lower level market; and
   using the automatic market maker to update the prediction market to represent the first and second markets as repriced.

12. The method of claim 11, further comprising generating a forecast responsive to the second market as repriced.

13. The method of claim 11, where the summary market mathematically depends on the lower level market as the sum of a price of the lower market and one or more additional markets, the second market is the summary market, and the second market is repriced by generating a sum representing the first market as repriced and a third market.

14. The method of claim 11, where the lower level market is mathematically related to the summary market as representing a portion of the summary market, where the second market is the lower level market and is repriced by generating a proportional adjustment to the lower level market based on repricing of the summary market.

15. The method of claim 14, further comprising repricing a third market that is also mathematically related to the summary market as representing a portion of the summary market, by generating a proportional adjustment to the third market based on repricing of the summary market.

16. The method of claim 15, further comprising generating a display with respective display values for each of the second market as repriced and the third market as repriced, each as a separate function of repricing of the summary market.

17. The method of claim 11, further comprising using the market maker to automatically reprice the first market based upon trades in the second market, and vice-versa.

18. The method of claim 11, further comprising generating a display with respective display values for each of the repriced first market and the repriced second market.

* * * * *